United States Patent Office 3,435,622
Patented Apr. 1, 1969

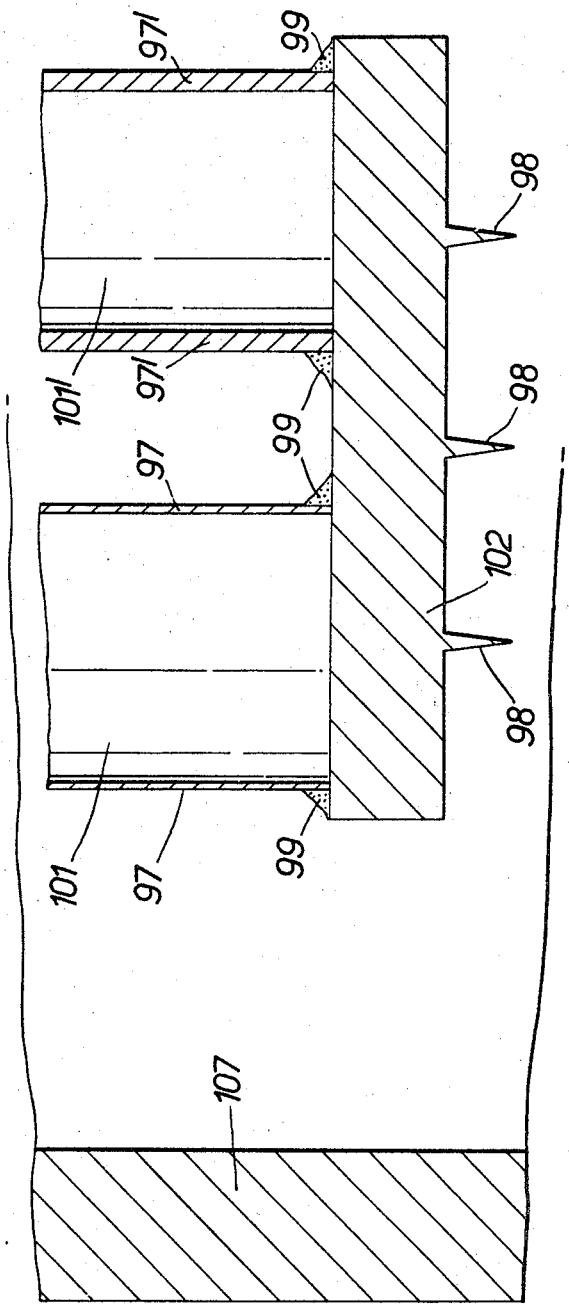

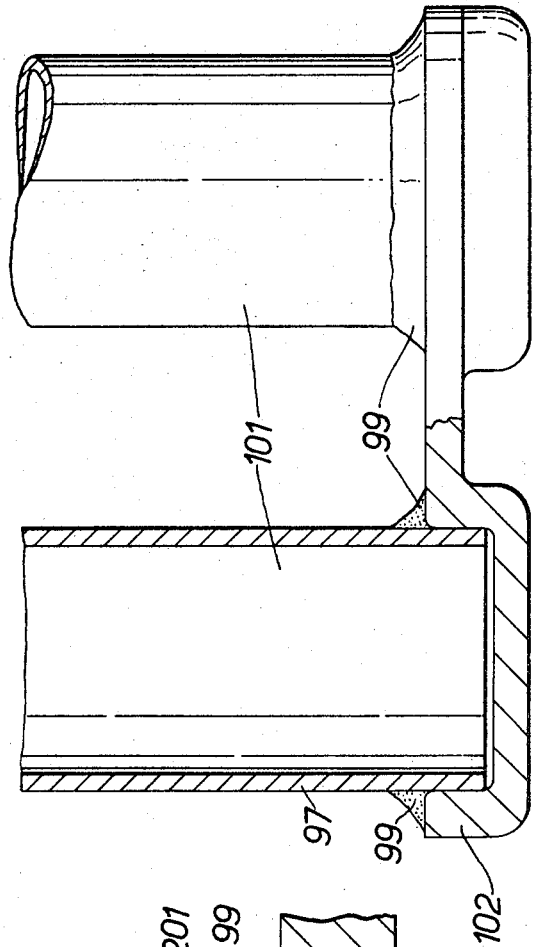
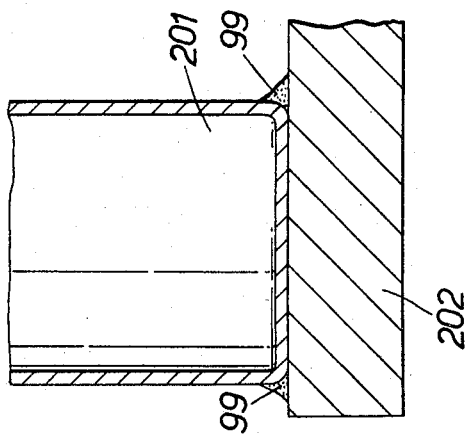

3,435,622
TEMPERATURE REFERENCE APPARATUS
Donald Moore Barton, London, and Colin Robinson, Reading, England, assignors to De La Rue Frigistor Limited, Langley, England, a British company
Filed Dec. 14, 1966, Ser. No. 601,640
Claims priority, application Great Britain, Dec. 23, 1965, 54,650/65
Int. Cl. F25b 21/02
U.S. Cl. 62—3    18 Claims

ABSTRACT OF THE DISCLOSURE

A temperature reference apparatus which includes a chamber containing water and connected to the interior of a bellows whereby any change in the volume occupied by the water during freezing and thawing causes movement of the bellows, which movement is employed to operate an electrical switch to control the temperature of the apparatus. The size of the bellows in relation to the quantity of water is arranged to be such that the bellows are not fully extended at any time before the water is completely frozen.

---

This invention relates to improved apparatus for maintaining thermocouple junctions at a constant known reference temperature by means of the thermoelectric cooling of a substance which undergoes a change of state at the reference temperature.

For accurate temperature measurement by the use of thermocouples the reference temperature must be accurately maintained and suitable apparatus for obtaining this desired conditon comprises essentially a heat insulated thermoelectrically cooled chamber which is adapted to receive thermocouple junctions and to contain as the working substance water which freezes at a convenient reference temperature..

The required reference temperature of 0° C. will be maintained all the time that there is ice and water next to the reference junction, the temperature being controlled by the water which melts and freezes during the cycle of heating/cooling operations at a substantially constant temperature. Thus the cooling power of the thermoelectric device must be sufficient to cool the chamber and the water to such an extent that the water will undergo a change of state and effect the desired cooling while heat is introduced through the leads of the thermocouples whose temperatures are required simultaneously to be maintained at a constant value.

In order to achieve the desired results the current supplied to the thermoelectric cooling devices is arranged to be in circuit with a switch which is operable in accordance with the expansion which takes place within the chamber upon the formation of ice. The apparatus is arranged to actuate the switch and to stop the cooling when a predetermined amount of ice has been produced. Conveniently the level is set at between 6 and 50% of ice, preferably between 12 and 32% and more especially at 25%.

These limits are chosen in order to avoid both excessive freezing, which might impair the action of the detecting device, and the creation of convection currents, which might cause undesired temperature differences.

In a known detecting device such as that described in our U.S. patent application Serial No. 374,748 there is provided a tubular chamber having one end sealed by a bellows which extends within the chamber. The chamber contains as the working substance a liquid which freezes at a convenient temperature. This liquid surrounds the outside of the bellows and to some extent the bellows impose a limit upon the amount of liquid which can be frozen without causing damage to the bellows.

The present invention provides an improved detecting device which may be applied to devices other than the particular type of device described in our above-mentioned patent specification and the present invention is in no way limted to devices of the type described in that patent specification.

One object of this invention is to provide an isothermal reference chamber and an improved form of bellows which when the whole of the water within the chamber freezes solid, is less likely to sustain damage to the bellows, the switching device or to any part of the apparatus than are the previously known arrangements.

A further object of the invention is to provide an arrangement having bellows in which the formation of ice within the depression of the convolutions of the bellows facilitates the movement of the bellows in the direction in which it is required to move upon the formation of ice.

According to the invention there is provided a temperature reference apparatus including a chamber containing water, thermoelectric cooling means positioned to cool the chamber and the water therein, and detecting means sensitive to a change of state of the water to control a supply of current to the thermoelectric cooling means when a predetermined portion of the water is frozen, the detecting means including a bellows, having an open end and a closed end, arranged externally of the chamber, the interior of the bellows being in liquid communication with the water in the chamber and the size of the bellows in relation to the quantity of water being such that the bellows are not fully extended at any stage before the water is completely frozen.

The apparatus preferably includes a spring loaded vertically slidable platform arranged beneath the lower end of the bellows and providing a mounting for the said switch in such a manner that the switch is adapted to cut off the current to the thermoelectric device when a predetermined quantity of frozen liquid has been produced and, subject to the bellows having been designed to take the expansion created by the freezing of the entire liquid contents of the chamber and bellows, to permit the bellows to expand without being damaged upon the production of any greater quantity of ice.

Preferably also the arrangement is such that the switch is a microswitch which is subjected only to the pressure created by the formation of a predetermined amount of ice, any greater pressure being taken up by the movement of the platform against the action of the spring.

In a further modification of the invention the apparatus includes two elongated tubes which are joined or sealed at their closed ends situated deep in the chamber by a member constructed of metal of good thermal conductivity and in good thermal contact with the said tubes.

The metal of good thermal conductivity is preferably copper or silver, but e.g. aluminium or nickel might be used.

The member of good thermal conductivity, preferably has an extended surface in contact with the water and an appreciable thermal mass so that by virtue of one or both of these properties, it is able to protect the closed end of the tubes and the thermocouples in contact therewith from any short sharp temperature fluctuation.

In one embodiment of the invention the member of good thermal conductivity forms part of the elongated tubes and serves to seal them.

In another embodiment of the invention the member of good thermal conductivity is fixed in good thermal contact to the previously sealed closed end of the elongated tubes.

The elongated tubes, at least in respect of that part of the tube which lies near the walls of the chamber, are preferably thin-walled and constructed of stainless steel. Stainless steel of 0.5 mm. thickness has been found a suitable wall thickness.

Most chromium steels having sufficient chromium content have rust-resistant properties, but some of these lose their rust-resistance if prepared in ductile form and hence will not be suitable. So called "18–18" stainless steel having 17–20% chromium and 8–10% nickel are readily available; they are strong and ductile and rust resistant in their ductile form; and they have sutiable thermal conductivities 0.15–0.24 watts/° C. cm. Other stainless steels in which the nickel and chromium levels are both about 12% are also suitable. In general the levels of nickel and chromium can be increased above these levels and other metals such as molybdenum and tungsten can be added. Compositions and properties of some suitable steels are given in the following Table 1.

with, but electrically insulated from, the cold junctions of thermoelectric cooling modules 11 and 12 which are adapted to cool the walls and contents of the chamber. The hot junctions of the thermoelectric devices are in good thermal contact, but electrically insulated from heat transfer blocks 13 and 14. To the heat transfer blocks 13 and 14 are attached thermally conducting heat exchangers in the form of finned plates 15 and 16.

Within the support frame 4 and bearing against the inner walls of the frame is a platform 17 which is drilled to provide a hole in its centre and biased upwardly by means of a coil spring 18. A microswitch unit 19 having normally closed contacts in circuit with the thermoelectric cooling devices and attached to the platform 17 has its operative plunger 20 projecting upwardly into the hole in the platform.

A bellows unit 21 which is closed at its lower end is

TABLE 1

| Steel and or Ref. | Composition, percent | | | | | | | Thermal Conductivity, watts/° C., cm. | Tensile Strength, t.p.s.i. | Elong., percent |
| --- | --- | --- | --- | --- | --- | --- | --- | --- | --- | --- |
| | C | Mn | Si | Ni | Cr | Mo | W | | | |
| T.W. 316 (W. W. Tyler, A. C. Wilson; RC-130B knolls Atomic Power Lab. Rept. 803 (1952)). | 0.1 | | | 12 | 17 | 2.5 | | 0.130 | | |
| En. No. 58J (Dearden "Iron and Steel Today" 2d Edn. 1956. p. 228). | 0.1 | | | 10 | 18 | 3 | | | 69 | 45 |
| E. Maurer, Arch. Eisenhuttenw. 1936, 10, 145 | 0.11 | 0.53 | 0.48 | 8.85 | 17.5 | | | 0.23 at 30° C.<br>0.234 at 100° C. | | |
| Stainless Steel En. No. 58A (Dearden p. 228) | 0.1 | | | 8 | 18 | | | | 46 | 45 |
| (Maurer loc. cit.) | 0.12 | 1.40 | 2.38 | 20.3 | 22.8 | | | 0.176 at 30° C. and at 100° C. | | |
| Do | 0.13 | 0.71 | 2.20 | 12.6 | 20.3 | | | do | | |
| Do | 0.48 | 1.44 | 1.22 | 12.2 | 12.9 | 2.9 | | 0.201 at 30° C. and at 100° C. | | |
| Stainless Steel En. No. 58D (Dearden p. 228) | 0.1 | | | 12 | 12 | | | | 57 | 65 |
| (Maurer loc. cit.) | 0.53 | 1.07 | | 11.9 | 13.3 | 9.9 | | 0.180 at 30° C.<br>0.188 at 100° C. | | |
| Basic Electrosteel heated to 1,100° C. and chilled in water. (N.P.L., "Physical Constants of some commercial steels at elevated temperatures," London, 1953.) | 0.08 | 0.37 | 0.68 | 8.14 | 19.1 | | 0.60 | 0.159 at 0° C.<br>0.163 at 100° C. | | |

Although it is desirable for the body of metal of good thermal conductivity to have a large surface in contact with the water, certain precautions are necessary. Direct thermal contact between the chamber walls and the mass of metal of good thermal conductivity must be avoided. The elongated tube or tubes of stainless steel, if thin-walled, form a sufficiently feeble thermal contact since the walls are bathed by the water (see FIGURE 4). On the other hand an ice bridge can form too strong a thermal contact between the closed end of the elongated tube and the chamber walls. The size of the body of metal of good thermal conductivity is limited by the need to avoid the formation of harmful ice bridges. Of course, the fraction of the water frozen affects these considerations.

Embodiments of the invention will now be described with reference to the accompanying drawings in which:

FIGURES 2, 3 and 4 show enlarged sections of some alternative forms of construction of elongated tubes within the appartaus

Figure 1:
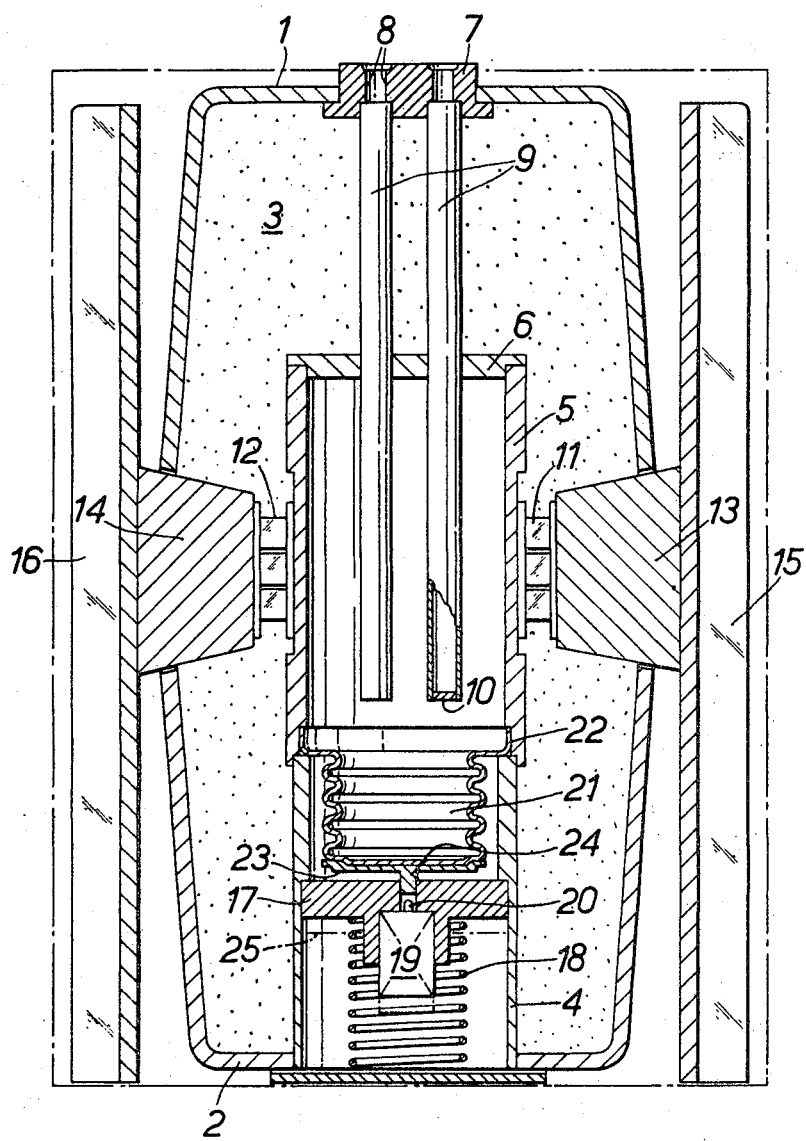
FIGURE 1 is a cross-section of one form of temperature reference apparatus.

The apparatus comprises a two-part casing 1 and 2 which is partly filled with a heat insulating material 3. On the bottom of the casing is provided a support frame 4 for a copper chamber having side walls 5 and a cover 6. The top of the casing 1 is provided with an insert member 7 including a plurality of drilled holes 8. The cover 6 is provided with holes in vertical register with the holes 8 in the top of the casing, both sets of holes being adapted to accommodate stainless steel tubes two of which are shown at 9; the tubes 9 are provided with copper tips one of which is indicated at 10. The tubes 9 are adapted to receive thermocouple leads and junctions (not shown) which are situated as closely as possible to the tips of the tubes.

The side walls 5 of the chamber are in thermal contact in open communication with the interior of the chamber and is attached to the side walls of the chamber at 22. The closed end of the bellows is provided with a disc 23 having a depending spigot 24 positioned immediately above the hole in the platform 17.

In operation the whole of the chamber and the interior of the bellows is filled with water. Cooling is effected by means of the thermoelectric cooling devices until a predetermined amount of ice is produced in the chamber. The bellows device is so dimensioned that when this critical amount of ice is formed it will extend thereby causing the spigot 24 to depress the plunger 20 of the microswitch and thus to cut off the current supply to the thermoelectric devices. The clearance between the top of the platform 17 and the under face of the disc 23, is approximately equal to the travel of the plunger 20 when the predetermined amount of ice has been produced. Thus when the spigot is moved sufficiently to actuate the switch there is no compression of the spring 18. However, under certain conditions it is possible for more than the predetermined quantity of ice to be formed or even for all the water to freeze. In such circumstances provided the bellows is designed to take the maximum possible expansion it will extend without, however, suffering any damage; one such position of the platform and microswitch is indicated by the dotted lines 25 in the drawing. The space below the platform 17 is large enough to accommodate the bellows in its fully extended state and as extension commences the platform will overcome the action of the spring 18 and descend. Because the pressure exerted by the under face of the disc 23 is taken up, against the action of the spring 18, by the top of the platform 17, no damage will be done to the microswitch upon the production of an excess amount of ice.

The switch may be a simple on-off device alone or one such in association with a switch for reversing, if and when required, the diretcion of current flow through the thermoelectric device thereby temporarily to provide heat at the junctions 8.

The apparatus has the advantage that ice forming in the convolutions of the bellows device causes it to move in its operation direction.

In a modification the bellows may be fitted to a rigid ring which fits the walls of the chamber at 22. In a further modification the microswitch unit 19 is raised so that the plunger 20 stands proud of the surface of the platform 17. The spigot 24 can then be eliminated—the plunger 20 being directly actuated by the disc 23 of the bellows unit 21.

The device of FIGURE 1 and the modified designs as just described provide a bellows and a switching device which are less liable to be damaged by complete freezing of the freezable liquid than are those of known arrangements. Where the danger is remote, the switching system can be simpler.

The detecting device is conveniently set to actuate the switch and halt the cooling when between 6 and 50% of the working liquid, and preferably when between 12 and 32% of the liquid, has frozen. These limits are chosen to avoid on the one hand excessive freezing which might impair the action of the detecting device or otherwise cause unwanted temperature differences, whilst on the other hand with too low a seting the critical density of the ice-water mixture will be imitated by warm water. In this latter case cooling will not occur at 11, but if on other grounds, a low critical degree of freezing is required, an optional by-pass of the switch can be included to be used in the case when the initial water temperature is too high.

Referring to FIGURES 2 and 4 one plate 102 serves as an end to two tubes 101 and 101'. It may be brazed on as shown at 99. Fins 98 may also be provided. The end plate 102 is preferably constructed of copper or silver. The walls 97, 97' of the tubes 101, 101' may be constructed of copper in the vicinity of the end plate or of stainless steel. The right hand tube 101' has its lower portion constructed of copper. The left hand tube 101 is constructed entirely of stainless steel apart from the end piece 102.

In a practical construction all of the tubes would normally be of the same type—the drawings are merely illustrative. The distance between the end plate 102 and the wall 107 of the chamber must be sufficient to reduce the danger of the formation of a direct ice-bridge.

Figure 5:
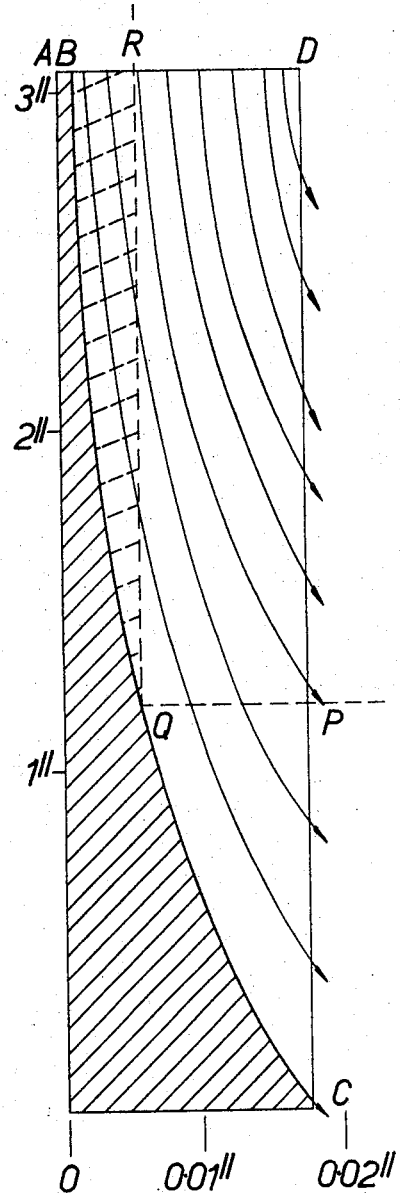
FIGURE 5 illustrates graphically the heat flow in a cross-section of a portion of the wall of the elongated tubes.

Referring to FIGURE 3 a tube 201 is constructed entirely of stainless steel. It is preferably brazed or soldered on to an end plate 202 which is constructed of a metal of good thermal conductivity. Where high accuracy is not required or where the heat load is small it may be possible to omit the end plate 202. FIGURE 5 shows schematically the flow of heat indicated by arrows in a vertical cross-section of a portion of the wall of an elongated tube. The horizontal scale is exaggerated in order to show the results more clearly. The rectangle AOCD represents a cross-section of the wall, the side CD being in contact with the water. The drawing merely serves to illustrate that from the viewpoint of transferring heat to the horizontal plane in which OC lies, only the portion ABCO (shown hatched) of the wall is effective, when the surface CD is washed with water; and also that icing up of the surface down to P will increase this effective thickness assuming that the ice is a good thermal insulator. Icing along the line PD will tend to make the flow lines above PQ almost vertical so that the area BRQ (with interrupted shading) is added to the effective heat conveying portion ABCO.

It has been found particularly suitable for the tube diameter to be less than 20% of the portion of the tube length in contact with the liquid, and for the tube diameter to be less than 12% of the total tube length.

Figure 6:
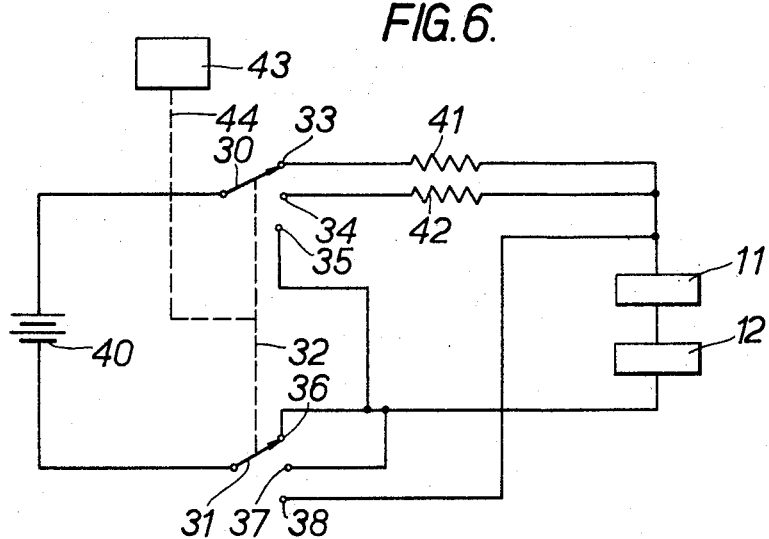
FIGURES 6 and 7 show electrical circuit diagrams.

Referring to FIGURE 6 there is shown a circuit arrangement in which the switch 19 has two moving contacts 30 and 31 coupled together mechanically as indicated by dotted line 32, and arranged to make connection to contacts 33, 34 and 35 and 36, 37, 38 respectively. The moving contacts 30 and 31 are connected to a source of power 40.

The contacts 33 and 34 are connected via a resistor 41 and a resistor 42 respectively, through the thermoelectric modules 11 and 12 to the contacts 35, 36 and 37. The resistor 41 is of a lower value than the resistor 42 and the contact 38 is connected to the side of the module 11 which is remote from the contact 35. A temperature sensitive device 43, which is arranged to detect the ambient temperature, is coupled, as shown by dotted line 44, to the coupling 32 between the moving contact 30 and 31 and switch 19.

In the operation of this arrangement, the position of the switch contacts 30 and 31 may be determined by the temperature detected by the thermostat 43. If the temperature detected by the thermostat 43 is comparatively high it may be arranged for the coupling 44 to cause the contacts 30 and 31 to be connected to the contacts 33 and 36 respectively, so that with the resistor 41 in circuit a higher current is passed through the modules 11 and 12 in order to provide more powerful cooling than if the connection were made via the resistor 42 and the contacts 34 and 37. If the ambient temperature detected by the thermostat 43 is lower it may be arranged that the coupling 44 causes the moving contacts 30 and 31 to be connected to the contacts 34 and 37 so that the resistor 42 is brought into circuit and a lower current is passed through the modules 11 and 12 so that a reduced cooling effect is produced.

Should the ambient temperature be such that in order to maintain the temperature in the chamber constant it is required that the thermoelectric modules 11 and 12 produce a heating effect, the thermostat 43 may act via the coupling 44 to move the contacts 30 and 31, so that they are connected to the contacts 35 and 38 respectively, thereby producing a reversal of the current flow through the modules 11 and 12 and heating the chamber. It may of course be arranged that in the connection between the modules and the contact 38 there is a resistor, similar to resistor 42, in order to regulate the current flow. By means of this control of the current reversal it is possible for the system to take account of changes in ambient temperature and to provide a compensating effect for these changes even before their effect has produced any significant changes in the conditions in the chamber.

Figure 7:
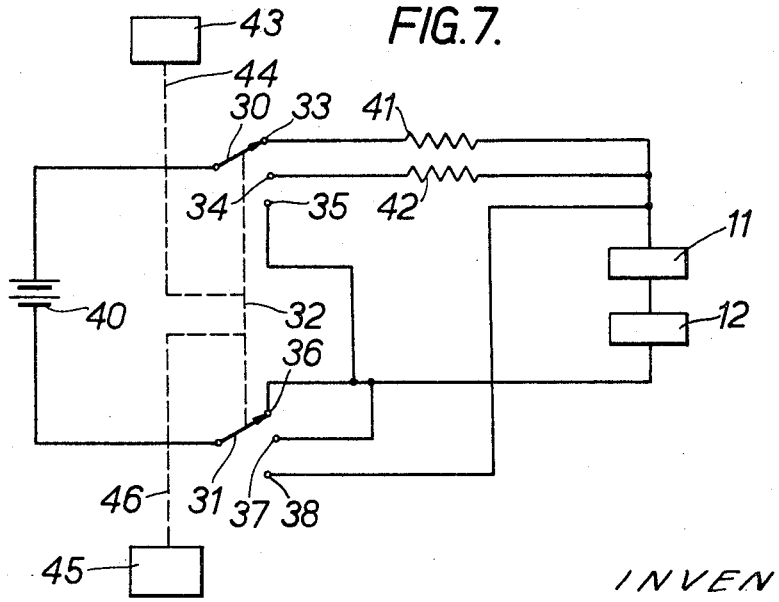

Referring to FIGURE 7 there is shown a circuit arrangement which is similar to that shown in FIGURE 6. This circuit includes the addition of a timer 45 coupled as indicated by the dotted line 46, to the coupling 32 between the switch contacts 30 and 31. The timer may be so arranged in combintaion with a control switch (not shown) that when power from the supply 40 is connected via the control switch the contacts 30 and 31 are initially coupled to the contacts 33 and 36 respectively, so that the initial cooling is comparatively rapid. The timer 45 may be set so that after a given period of time it acts via the coupling 46 to cause the switch contacts 30 and 31 to move to contacts 34 and 37 respectively, so that the source 40 is connected via the resistor 42 to the modules 11 and 12 and a less rapid cooling effect is produced by the modules 11 and 12 due to the reduction in current.

The tubes 9 may be made of a combination of any suitable materials which provides the part near to the chamber walls with poor thermal conductivity while that at the tip has good thermal conductivity. Of course, it is not essential that tubes should be provided to hold the thermocouples. These thermocouples may be sealed directly in contact with the liquid within the chamber, though in such constructions it is less easy to change the thermocouples. In those arrangements which have tubes the apparatus normally stands with the open end of the tube upwards and the tube vertical, though it may be arranged for the tube to be at an angle as great as 45° from the vertical. The tube may contain a thermally conducting liquid situated at the closed end of the tube in order to improve the transfer of heat between the tube and the thermocouple.

We claim:

1. A temperature reference apparatus including a chamber containing water, thermoelectric cooling means positioned to cool the chamber and the water therein, detecting means sensitive to a change of state of the water to control the supply of current to the thermoelectric cooling means when a predetermined portion of the water is frozen, the detecting means including a bellows having an open end and a closed end arranged externally of the chamber, the interior of the bellows being in liquid communication with the water in the chamber, the size of the bellows in relation to the quantity of water being such that the bellows are not fully extended at any stage before the water is completely frozen, a switch and a spring loaded platform upon which the switch is yieldably mounted, the switch being arranged to be operated to disconnect the supply of current to the thermoelectric cooling means when the bellows are extended by a predetermined amount, and the spring loaded platform being arranged to absorb any further expansion of the bellows by movement of the platform without damage being caused to the switch.

2. Apparatus as claimed in claim 1, which includes an elongated tube formed from stainless steel and sealed at one end with a copper cap extending through one of the walls of the chamber with its closed end situated within the chamber, the tube being designed so that a thermocouple junction may be accommodated within the tube adjacent the closed end thereof.

3. Apparatus as claimed in claim 1, which includes an elongated tube extending through one of the walls of the chamber and having a closed end situated within the chamber, the tube being made from a good thermally conducting material near to its closed end, and of a poor thermally conducting material near to the chamber walls, the tube being designed so that a thermocouple junction may be accommodated within it adjacent the closed end thereof.

4. Apparatus as claimed in claim 2, wherein the tube diameter is less than 20% of the portion of the tube length in contact with the water in the chamber.

5. Apparatus as claimed in claim 2, wherein the tube length is less than 12% of the total tube length.

6. Apparatus as claimed in claim 2, and designed to stand in normal operation with the open end of the tube upwards, the tube being vertical or within 45° of the vertical.

7. Apparatus as claimed in claim 3, wherein the closed end of the tube contains a thermally conducting liquid.

8. A temperature reference apparatus including a chamber containing water, thermoelectric cooling means positioned to cool the chamber and the water therein, an elongated tube formed from stainless steel and sealed at one end with a copper cap, extending through one of the walls of the chamber and having a closed end situated within the chamber, the tube being designed so that a thermocouple junction may be accommodated within the tube adjacent the closed end thereof, and detecting means sensitive to a change of state of the water to control the supply of current to the thermoelectric cooling means when a predetermined portion of the water is frozen, the detecting means including a bellows, having an open end and a closed end, arranged externally of the chamber, the interior of the bellows being in liquid communication with the water in the chamber, and the size of the bellows in relation to the quantity of water being such that the bellows are not fully extended at any stage before the water is completely frozen.

9. Apparatus as claimed in claim 8 wherein the open end of the bellows is hermetically sealed to an open end of the chamber to provide an extension thereof.

10. An apparatus as claimed in claim 8 in which the detecting means includes a switch which is yieldably mounted and is arranged to be operated to disconnect the supply of current to the thermoelectric cooling means when the bellows are extended by a predetermined amount, the mounting being such that further expansion of the bellows is absorbed by movement of the mounting without damage being caused to the switch.

11. Apparatus as claimed in claim 10, wherein the said switch is arranged to provide a reverse current flow.

12. Apparatus as claimed in claim 11, including means to operate the switch to provide a reverse current flow according to variations in ambient temperature.

13. Apparatus as claimed in claim 10, wherein the switch is arranged to cause more rapid initial cooling by the said cooling means initially and less rapid cooling later.

14. Apparatus as claimed in claim 10, wherein the switch is automatically switched to more powerful cooling with higher ambient temperature.

15. Apparatus as claimed in claim 8 in which the copper cap is extended to serve as a cap to a second similar tube.

16. Apparatus as claimed in claim 8 which includes an elongated tube extending through one of the walls of the chamber and having a closed end situated within the chamber, the tube being made from a good thermally conducting material near to its closed end, and of a poor thermally conducting material near to the chamber walls, the tube being designed so that a thermocouple junction may be accommodated within it adjacent the closed end thereof.

17. Apparatus as claimed in claim 16 in which the metal of good thermal conductivity is selected from the group consisting of copper, silver, aluminium and nickel.

18. Apparatus as claimed in claim 16 which includes a second elongated tube similar to the said elongated tube, the two elongated tubes being joined adjacent their closed ends by a member of good thermal conductivity to provide a good heat conductive path between them.

References Cited

UNITED STATES PATENTS

| 2,963,531 | 12/1960 | Seegert | 136—4 |
| 2,986,890 | 6/1961 | Bevans | 62—3 |
| 2,989,281 | 6/1961 | Fritts | 62—3 |
| 3,027,725 | 4/1962 | Harvey | 62—3 |
| 3,091,940 | 6/1963 | Feldman | 62—3 |
| 3,192,727 | 7/1965 | Ashby | 62—3 |

WILLIAM J. WYE, *Primary Examiner.*